Figure 1:
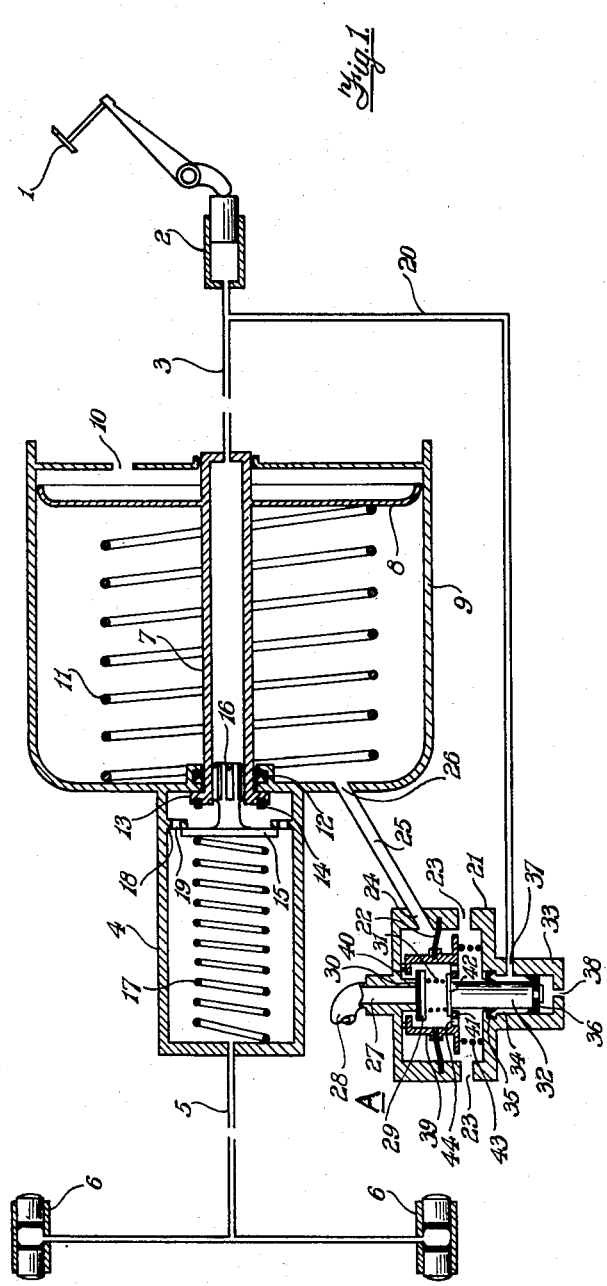

March 2, 1954  S. H. EDGE  2,670,604
SERVO-ASSISTED OPERATING MECHANISM
Filed Nov. 29, 1951  2 Sheets-Sheet 1

Inventor
Stanley Howard Edge
By
Attorneys.

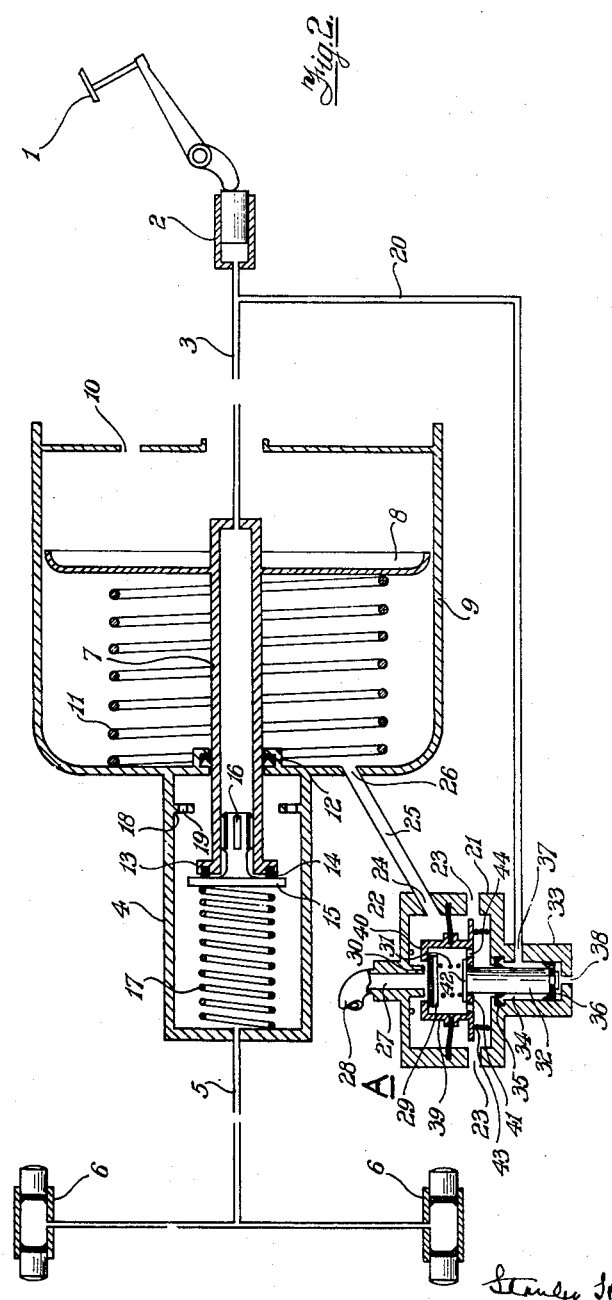

Patented Mar. 2, 1954

2,670,604

UNITED STATES PATENT OFFICE 2,670,604

SERVO-ASSISTED OPERATING MECHANISM

Stanley Howard Edge, Danesgate, Lincoln, England, assignor to Clayton Dewandre Company Limited, Lincoln, England Application November 29, 1951, Serial No. 258,843

6 Claims. (Cl. 60—54.5)

This invention relates to servo-assisted operating mechanism and has more particular reference to mechanism of the kind wherein the actuation of a foot pedal or other manual control device is transmitted through a hydraulic system to the braking or other mechanism under control, the object of the invention being to provide an improved and simplified arrangement wherein the effort transmitted through the hydraulic system is boosted by vacuum or fluid pressure operated means.

According to the invention a servo-assisted operating mechanism includes a hydraulic transmission system between a pedal or like actuator and an output cylinder or cylinders, a hydraulic cylinder forming part of said transmission system, and a piston and cylinder servo device adapted to be operated by vacuum or fluid-pressure under the control of said actuator, characterised in that said servo piston is adapted to operate a rod which extends into said hydraulic cylinder and which is adapted to act as a displacement member or ram to increase the pressure transmitted from the hydraulic cylinder to the output cylinder or cylinders.

According to a preferred form of the invention a servo-assisted operating mechanism comprises a pedal or like-operated master cylinder communicating through a hydraulic cylinder with an output cylinder or cylinders, a vacuum or fluid-pressure operated piston and cylinder servo device, the piston rod of which extends into said hydraulic cylinder, and is adapted to act as a displacement member or ram, and a reaction valve adapted to be operated by pressure transmitted from the master cylinder for controlling the operation of the servo device, whereby, upon the operation of said servo piston, the piston rod is advanced in the hydraulic cylinder to displace liquid therefrom and increase the pressure transmitted to the output cylinder or cylinders to a degree proportional to the manual effort applied to operate the master cylinder.

Reference will now be made to the accompanying drawings, which illustrate schematically a servo-assisted operating mechanism according to the invention having a vacuum-type servo and arranged to operate the brakes of a vehicle, and in which Figs. 1 and 2 show the mechanism at rest and in operation respectively.

In the construction illustrated an actuating pedal 1 is arranged to operate a hydraulic master cylinder 2 connected by a conduit 5 to output cylinders 6 arranged to actuate the vehicle brakes (not shown). The terminal portion of the conduit 3 remote from the master cylinder 2 is constituted by a tubular piston rod 7 carrying a piston 8 mounted in a vacuum cylinder 9 to one end of which is attached the hydraulic cylinder 4. The piston 8 and cylinder 9 constitute a vacuum type servo device. One side of the piston 8 is exposed to atmosphere through a port 10 in the vacuum cylinder 9, and a spring 11 is arranged to urge the piston towards its inoperative position as shown in Fig. 1. In order to permit the necessary movement of the piston 8 and rod 7, a portion of the conduit 3 is formed of flexible material.

The tubular piston rod 7 passes through a gland 12 mounted in the end wall of the vacuum cylinder 9, and projects into the hydraulic cylinder 4. The open end of said piston rod within the hydraulic cylinder is formed with a collar 13, which serves to limit rearward movement of the piston, and in the end face of which there is mounted an annular seal 14. This seal provides a valve seat for a poppet type valve member 15, whose short fluted stem 16 is slidably supported within the open end of the piston rod 7. Between the head of the valve member 15 and the outer end of the hydraulic cylinder 4 there is disposed a coil spring 17. This spring normally holds the head of the valve member 15 against an abutment formed by a flange 18 which projects inwardly from the inner surface of the wall of the hydraulic cylinder adjacent the inner end thereof, and which is formed with a number of holes 19. When the valve member 15 is in this position with the piston 8 at the full extent of its rearward travel, i. e. in its inoperative position as shown in Fig. 1, there is an annular space between the open end of the piston rod 7 and the valve member 15 providing a free passage for hydraulic liquid from the master cylinder 2, through the tubular piston rod into the hydraulic cylinder 4; the holes 19 in the flange 18 permit free communication between both ends of the hydraulic cylinder under such conditions.

The conduit 3 leading from the master cylinder 2 has a branch 20 communicating with a fluid controlled vacuum reaction valve, indicated generally by the letter A, which is operable by an increase of pressure in the master cylinder created by operation of the pedal 1 to place the vacuum cylinder 9 in communication with a source of vacuum (not shown) to cause operative movement of the piston 8. The valve is preferably arranged to control this communication in such a manner that the degree of vacuum exerted in the vacuum cylinder 9 is proportional to the manual effort applied to the pedal.

The reaction valve, by which is meant the actual valve member and its associated operating mechanism, may be of any convenient form, and is shown by way of example in the accompanying drawings as comprising a casing 21 divided internally by a flexible diaphragm 22 secured peripherally to the walls of the casing. On one side of the diaphragm the interior of the casing communicates with atmosphere through ports 23. On the other side of the diaphragm the interior of the casing communicates through a port 24, conduit 25, and port 26, with the interior of the vacuum cylinder 9, and through a passage 27 and conduit 28 with a source of vacuum (not shown). Normally, i. e. when the mechanism is at rest or inoperative, this latter communication is closed by a disc valve member 29, which is urged onto a valve seat 30 surrounding the passage 27 by a spring 31. At its lower end, this spring bears against the upper end of a plunger 32 which extends through an aperture in the wall of the casing 21 into a cylindrical extension 33 thereof. The internal diameter of this cylindrical extension is greater than the diameter of the plunger thereby forming an annular space 34, which is enclosed at the top by an annular sealing gland 35, through which the plunger is adapted to reciprocate, and at the bottom by a cup washer 36 fixed to the lower end of the plunger 32.

The annular space 34 communicates through a port 37 and the conduits 20 and 3 with the hydraulic master cylinder 2, and the interior of the casing below the cup washer 36 communicates with atmosphere through a small orifice 38. Freely surrounding the disc valve member 29 is a cylindrical member 39 secured centrally of the diaphragm 22 and formed with inwardly directed flanges 40 and 41 at its upper and lower ends respectively. The lower flange 41 engages a flange 42 formed on the upper end of the plunger 32, whilst the upper flange 40 is arranged to overlap the outer peripheral portion of the disc valve member 29, and to surround with clearance the valve seat 30. A spring 43 is arranged to urge the cylindrical member 39 upwardly, into a position in which communication is established between the vacuum cylinder 9 and atmosphere, whereby the servo-piston 8 is rendered inoperative. This communication takes place through the conduit 25, the port 24, the upper end of the cylindrical member 39 between the flange 40 and the disc valve member 29, the interior of said member, and through a number of holes 44 in the lower flange 41, and the atmospheric ports 23.

An alternative form of reaction valve is described in my copending application Serial No. 179,520, filed August 15, 1950.

When pressure is applied to the pedal 1 the master cylinder 2 is operated and simultaneously sets up a pressure in the hydraulic system and in the annular space 34 in the valve. This increase of pressure in the annular space causes downward movement of the plunger 32 and with it the cylindrical member 39, the upper flange 40 of which engages the disc valve 29 to cut off the vacuum cylinder 9 from atmosphere and, by further movement of the cylindrical member unseats said disc valve member to place the vacuum cylinder in communication with the source of vacuum. The piston 8 in the vacuum cylinder 9 is thereby set in operation to cause its piston rod 7 to advance from its initial retracted position further into the hydraulic cylinder 4. The first effect of this operation is to bring the annular seal 14 into contact with the head of the valve member 15 which thus closes the outer end of the tubular piston rod and seals the hydraulic cylinder 4 from the conduit 3 leading from the master cylinder 2, the sealing operation being assisted by the spring 17 which becomes compressed as the piston rod advances into the hydraulic cylinder. Thereafter, the piston rod advancing in the hydraulic cylinder acts as a displacement member or ram to increase the hydraulic pressure transmitted to the brake applying cylinders 6. As the degree of vacuum exerted in the cylinder 9 is proportional to the manual effort applied to the pedal 1 up to a predetermined point when full vacuum is exerted, the effort transmitted to the brake cylinders 6 from the hydraulic system will also be in proportion to the effort applied to the pedal within the limit set by the point where full vacuum is exerted in the vacuum cylinder. With the reaction valve described above this is achieved by proportioning the diameter of the flexible diaphragm 22 in relation to the difference between the diameter of the plunger 32 and the inner diameter of the cylindrical extension 33 of the casing 21. It will be seen that when the disc valve member 29 has been unseated the whole of the casing 21 above the diaphragm 22 is placed under vacuum which, in conjunction with the springs 43 and 31 tends to withdraw the diaphragm from the position shown in Fig. 2 to that shown in Fig. 1 and simultaneously to seat the disc valve member 29. This reaction is transmitted to the pedal 1, and in consequence a sustained pedal effort is necessary to maintain the cylinder 9 under vacuum, and an increasing effort at the pedal to obtain a proportional increase in the effort transmitted to the brake applying cylinders 6.

The arrangement above described possesses the advantages that failure of the vacuum source does not affect the hydraulic system which, owing to the free communication which exists between both parts of that system when the valve member 15 is open, can still transmit impulses from the master cylinder 2 to the brake applying cylinders 6 when the pedal 1 is actuated.

The invention possesses the further advantage that the vacuum cylinder and the hydraulic cylinder constitute a self contained unit capable of installation at any convenient point on a vehicle chassis and does not require mechanical assistance from the chassis apart from mere support.

I claim:

1. A servo-assisted operating mechanism comprising at least one output cylinder, a hydraulic cylinder having its interior in communication with the output cylinder, a fluid-pressure operated servo-cylinder mounted at one end of the hydraulic cylinder, a piston disposed within the servo-cylinder, a tubular piston rod mounted on said piston and projecting into the hydraulic cylinder to be advanced therein by operation of said piston, a valve seat at the forward end of the piston rod, a manually operated master cylinder communicating with the interior of the piston rod at its rear end and providing communication between the master cylinder and output cylinder through the piston rod and hydraulic cylinder, a valve member supported by the piston rod and engageable with the valve seat at the forward end thereof for controlling said communication between the master cylinder and the output cylinder, said valve member being subject to pressure of liquid in the hydraulic cylinder to force it onto said valve seat when the piston rod is initially advanced in the hydraulic cylinder to thereby close the communication between the master cylinder and the hydraulic cylinder through the piston rod and enable the latter, when advanced further within the hydraulic cylinder, to displace liquid therefrom and thereby transmit pressure to the output cylinder, means for disengaging said valve member from said valve seat on the piston rod when the piston rod is in a fully retracted position to thereby establish said communication between the master cylinder and the output cylinder, a valve device for controlling the operation of said piston, said valve device communicating with the master cylinder and being operable by pressure generated therein, and means within said valve device for porportioning the output of the servo-piston to the manual effort applied to the master cylinder.

2. A servo-assisted operating mechanism comprising at least one output cylinder, a hydraulic cylinder having its interior in communication with the output cylinder, a fluid-pressure operated servo-cylinder mounted at one end of the hydraulic cylinder, a piston disposed within said servo-cylinder, a tubular piston rod mounted on said piston and projecting into the hydraulic cylinder and being advanced therein by operation of said piston, said piston rod having an annular valve seat at its forward end, a manually operated master cylinder, a conduit connected to the rear end of said piston rod and communicating with the interior thereof and providing communication between the master cylinder and the output cylinder through said conduit, piston rod and hydraulic cylinder, a poppet-type valve member having a fluted stem slidably supported in the forward end of the piston rod and having a disc-shaped head adapted to cooperate with the annular valve seat at the forward end of the piston rod, said disc-shaped head being subject to pressure of liquid in the hydraulic cylinder to force it on said valve seat when the piston rod is initially advanced in the hydraulic cylinder to thereby interrupt communication through the piston rod whereby further advance of the piston rod within the hydraulic cylinder will displace liquid therefrom and thereby transmit pressure to the output cylinder, means for disengaging said valve member from said valve seat when the piston rod is in a fully retracted position to thereby establish said communication between the master cylinder and the output cylinder, a valve device for controlling the operation of said piston, said valve device communicating with the master cylinder and being operated by pressure generated therein, and means within said valve device for proportioning the output of the servo-piston to the manual effort applied to the master cylinder.

3. A servo-assisted operating mechanism comprising at least one output cylinder, a hydraulic cylinder having its interior in communication with the output cylinder through a connection between the forward end of the hydraulic cylinder and the output cylinder, a fluid-pressure operated servo-cylinder mounted co-axially at the rear end of the hydraulic cylinder, a piston disposed within the servo-cylinder, a tubular piston rod mounted on said piston and projecting into the hydraulic cylinder, said piston rod having an annular valve seat at its forward end, a manually operated master cylinder, a conduit connecting the master cylinder to the rear end of said piston and communicating with the interior thereof, the master cylinder thereby communicating with the output cylinder through said conduit, piston rod and hydraulic cylinder, a poppet-type valve member having a fluted stem slidably supported in the forward end of the piston rod and having a disc-shaped head cooperable with the annular valve seat at the forward end of the piston rod, said disc-shaped head being subject to pressure of liquid in the hydraulic cylinder to force it onto said valve seat on the piston rod when the latter is initially advanced in the hydraulic cylinder to thereby close communication through the piston rod and enable the latter, when advanced further within the hydraulic cylinder, to displace liquid therefrom and thereby transmit pressure to the output cylinder, a coil spring interposed between the forward end of the hydraulic cylinder and the head of said valve member for urging the latter toward its seated position against the annular valve seat at the forward end of the piston rod, means for disengaging said valve member from said valve seat when the piston rod is in fully retracted position to thereby establish said communication between the master cylinder and the output cylinder, a valve device for controlling the operation of said piston, said valve device communicating with the master cylinder and being operated by pressure generated therein, and means within said valve device for proportioning the output of the servo-piston to the manual effort applied to the master cylinder.

4. A servo-assisted operating mechanism comprising at least one output cylinder, a hydraulic cylinder having its interior in communication with the output cylinder, a fluid-pressure operated servo-cylinder mounted at one end of said hydraulic cylinder, a piston disposed within the servo-cylinder, a tubular piston rod mounted on said piston and projecting into the hydraulic cylinder to be advanced therein by operation of said piston, an annular valve seat at the forward end of said piston rod, a manually operable master cylinder communicating with the interior of said piston rod at its rear end and providing communication between the master cylinder and output cylinder through said piston rod and hydraulic cylinder, a poppet-type valve member having a fluted stem slidably supported in the forward end of the piston rod and having a disc-shaped head to cooperate with the annular valve seat at the forward end of the piston rod, said disc-shaped head being subject to pressure of liquid in the hydraulic cylinder to force it by said pressure onto said valve seat when the piston rod is initially advanced in the hydraulic cylinder to close communication through the piston rod and cause the latter, when advanced further within the hydraulic cylinder, to displace liquid therefrom and thereby transmit pressure to the output cylinder, abutment means projecting from the inner surface of the wall of the hydraulic cylinder for intercepting the head of the valve member and holding it out of engagement with said valve seat when the piston rod is in fully retracted position to thereby establish said communication between the master cylinder and the output cylinder, said abutment means being formed with at least one aperture to permit free passage of liquid past the head of the valve member while the latter is held in its unseated position by said abutment means, a valve device for controlling operation of said piston, said valve device communicating with the master cylinder and operable by pressure generated therein, and means within said valve device for proportioning the output of the servo-piston to the manual effort applied to the master cylinder.

5. A servo-assisted operating mechanism as defined in claim 1, wherein said valve device for controlling the operation of the servo-piston comprises a casing, a flexible diaphragm dividing the interior of said casing into first and second chambers, the first chamber having a port connected to the servo-cylinder and a port for connection to a source of vacuum, and the second chamber having at least one port opening to atmosphere, a hollow cylindrical member secured to said diaphragm centrally thereof and having at least one aperture for providing communication between the port to the servo-cylinder and the port to atmosphere, a spring-loaded disc-valve member disposed within said cylindrical member and normally urged to close the port for connection to the source of vacuum, and a plunger connected to said cylindrical member and operable by an increase of pressure in the master cylinder to move said cylindrical member first into engagement with said disc-valve member to thereby close said aperture and cut off communication between the servo-cylinder and atmosphere, and to move said cylindrical member further to unseat the disc-valve member from the port for connection to the source of vacuum to thereby place the servo-cylinder in communication therewith for operation of the servo-piston.

6. A servo-assisted operating mechanism as defined in claim 5, including a cylinder in which said plunger is slidably mounted, said cylinder forming an extension of said valve casing and having an internal diameter greater than the diameter of the plunger to form an annular working space and having a port in the wall thereof connected with the master cylinder to place said working space in communication therewith, a gland fixed at the end of the cylinder adjacent to the valve casing for sealing one end of said working space, said plunger extending through said gland for connection to said cylindrical member within said valve casing, and a cup washer mounted on the end of said plunger remote from said cylindrical member and having sliding engagement with the internal surface of said cylinder to seal the other end of said working space, said washer being responsive to increases of pressure in the master cylinder to cause operative movement of the plunger.

STANLEY HOWARD EDGE.

References Cited in the file of this patent

UNITED STATES PATENTS

| Number | Name | Date |
|---|---|---|
| 2,006,487 | Sorensen | July 2, 1935 |
| 2,260,492 | Stelzer | Oct. 28, 1941 |
| 2,393,524 | Fant | Jan. 22, 1946 |
| 2,468,706 | Price | Apr. 26, 1949 |